United States Patent [19]

Tada et al.

[11] Patent Number: 4,985,823

[45] Date of Patent: Jan. 15, 1991

[54] IMAGE-FORMING APPARATUS

[75] Inventors: Tatsuya Tada, Kawasaki; Yasuyoshi Yamamoto, Tokyo, both of Japan

[73] Assignee: Canon Kabushiki Kaisha, Tokyo, Japan

[21] Appl. No.: 401,623

[22] Filed: Aug. 31, 1989

[30] Foreign Application Priority Data

Aug. 31, 1988 [JP] Japan ................................ 63-214802
Aug. 31, 1988 [JP] Japan ................................ 63-214804
Aug. 31, 1988 [JP] Japan ................................ 63-214805

[51] Int. Cl.[5] .............................................. G01D 15/10
[52] U.S. Cl. .................................................. 346/160.1
[58] Field of Search ........................... 346/160.1, 153.1

[56] References Cited

U.S. PATENT DOCUMENTS 4,772,915 9/1988 Kando .......................... 346/153.1 X
4,777,499 10/1988 Okuna et al. ...................... 346/160.1
4,875,063 10/1989 Idenawa et al. ................. 346/160.1

*Primary Examiner*—Donald A. Griffin
*Attorney, Agent, or Firm*—Fitzpatrick, Cella, Harper & Scinto

[57] ABSTRACT

An image-forming apparatus for developing an electrostatic latent image using a two-component developer. Toner replenishment is effected in different modes when the toner concentration is in a lower toner concentration range than a desired toner concentration and when it is lower than that toner concentration range.

12 Claims, 16 Drawing Sheets

IMAGE-FORMING APPARATUS

BACKGROUND OF THE INVENTION

1. Field of the Invention

This invention relates to an image-forming apparatus, in which an electrostatic latent image is formed by such means as an electro-photographic system or electrostatic recording system and developed with a developer including a toner and a carrier.

2. Related Background Art

In a well-known extensively used image-forming apparatus including a step of visualizing a latent image formed on an image carrier surface with a toner attached to the image, a two-component developer is used, which includes toner particles and carrier particles.

In the image-forming apparatus used with such a two-component developer, it is the toner that is actually consumed to form a developed image, and the carrier is hardly consumed. Therefore, when the developing operation is continued in this apparatus, the amount of toner contained in the developer is inevitably reduced to reduce image concentration. Therefore, it is necessary to detect the proportion of toner in the developer, i.e., toner concentration, and replenish with toner when the toner concentration is reduced.

Various toner concentration sensors have been proposed and used in practice. Among these means are optical means, which detects a change in the light reflectivity of the developer caused by a change in the toner concentration, and magnetic means, which detects a change in magnetic permeability of the developer.

However, the amount of toner that is consumed varies depending on the image ratio of an original that is copied; for instance, a difference in the toner consumption by ten or more times is produced between an original with an image ratio of 6% and an original with an image ratio of 100%. Therefore, if the amount of toner supplied from a toner replenishment port to a toner vessel or container in one cycle of replenishment is reduced, the toner concentration becomes insufficient eventually by continuing the copying of an original having a high image ratio.

On the other hand, when the amount of replenishment toner supplied per cycle is increased, a temporary excessive toner concentration condition is produced when replenishment toner is supplied while copying an original having a low image ratio, and this leads to deterioration of the image quality.

To solve the above problems, a small quantity of replenishment toner is supplied per cycle to reduce the change in the toner concentration at the time of supply of replenishment toner. When the copying of a high image ratio original is continued, the number of toner replenishment cycles is temporarily increased, or the copying operation is temporarily suspended and resumed after restoration of the toner concentration to a predetermined value.

The graphs of FIGS. 1 and 2 show the toner concentration controlled in the above way in the case when a toner concentration sensor provides a potential signal as a detected toner concentration signal. FIG. 1 shows the toner concentration when low image ratio original is copied, and FIG. 2 shows when a high image ratio original is copied. In the graphs, the ordinate is the sensor output voltage (representing toner concentration), and the ordinate is the number of copy sheets or time. In these Figures, designated at Vb is the voltage corresponding to the detected toner concentration, and Vc a voltage corresponding to a desired toner concentration To, i.e., reference value. The toner concentration of the developer can be controlled in the neighborhood of the reference value Vc by repeatedly causing operations of discontinuing replenishment toner supply when copying low image ratio original, i.e., when $Vb \geqq Vc$, and resuming toner supply when $Vb < Vc$. In other words, while replenishment with toner is being made according to toner consumption, the sensor output voltage Vb is varied, i.e., increased and reduced with respect to the reference value Vc, between values Vmax and Vmin corresponding to respective limit toner concentrations, i.e., limits of a permissible image density range.

However, when the image ratio is increased or when toner consumption exceeds toner replenishment so that a condition $Vb > Vc$ is continued for more than t seconds, for instance, a predetermined toner concentration can not be maintained unless the copying operation is temporarily suspended or the cycles of toner replenishment are increased. Where such toner concentration control is made, however, if the preset time t is too short, the operation noted above is caused even when the toner consumption does not exceed the toner replenishment. For this reason, a considerably long time has to be set as time t. Therefore, an insufficient toner concentration condition as shown at a in FIG. 2 or excessive toner concentration condition as shown at b due to temporary excessive toner replenishment are produced, leading to image quality deterioration.

SUMMARY OF THE INVENTION

An object of the invention is to provide an image-forming apparatus, which can overcome the deficiencies discussed above inherent in the prior art.

Another object of the invention is to provide an image-forming apparatus, which permits satisfactory toner concentration control irrespective of toner consumption per unit time.

The above and other objects and features of the invention will become more apparent from the following description with reference to the accompanying drawings.

DESCRIPTION OF THE PREFERRED EMBODIMENTS

Now, an image-forming apparatus, to which the invention can be applied, will be described with reference to FIG. 3.

Figure 1:
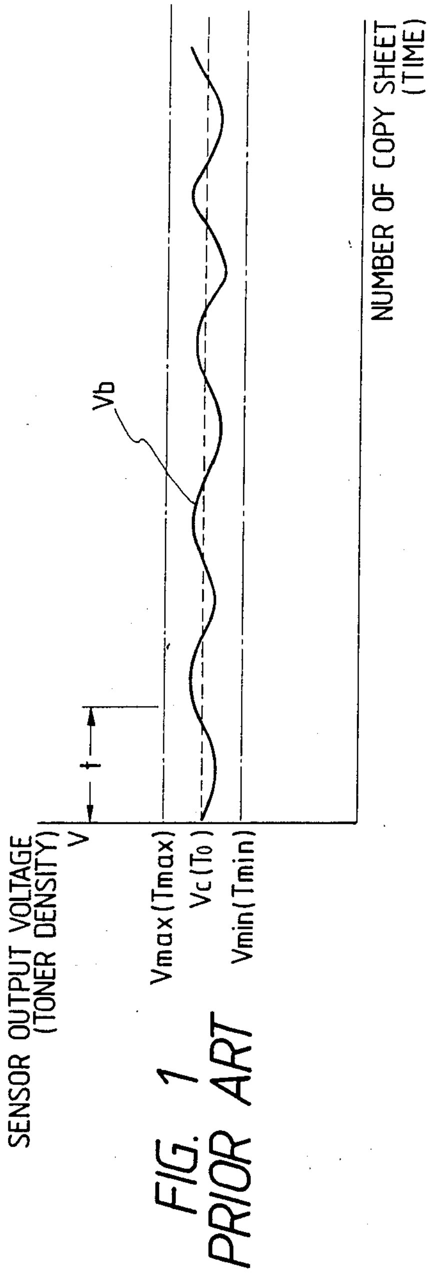
FIG. 1 PRIOR ART
FIGS. 1 and 2 are graphs for explaining the manner of changes in toner concentration in a prior art image-forming apparatus.
Figure 2:
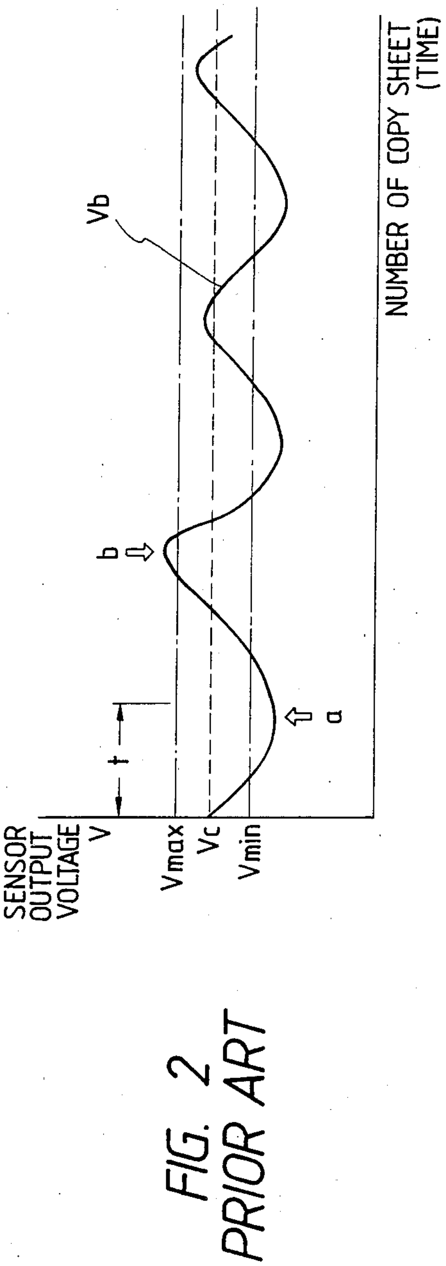
FIG. 2 PRIOR ART
Figure 3:
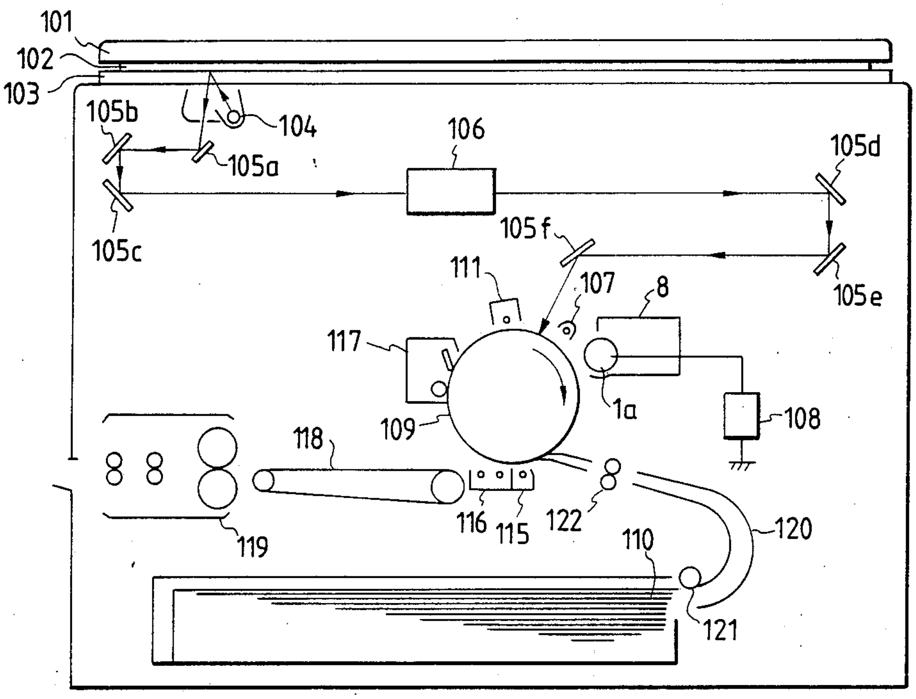
FIG. 3 is a schematic view for explaining an example of an image-forming apparatus, to which the invention can be applied.

Referring to FIG. 3, an optical image of an original 102 set on a original holder 103 and urged by a cover 101, is led by an optical system to be projected for exposure onto an electro-photographic drum 109 rotated in the direction of the arrow. The optical system includes an original illumination lamp 104 and mirrors 105*a* to 105*c*, these parts being movable in directions parallel to the original holder 103 for scanning the original, and also includes a lens 106 and stationary mirrors 105*d* to 105*f*. The electro-photographic drum 109 is uniformly precharged by a precharger 111 prior to exposure to the optical image noted above, and when it is exposed to the optical image, an electrostatic latent image is formed on it. When the optical system is inoperative so that the drum 109 is not exposed to any optical image although the precharger 111 is operative, a lamp 107 is turned on to discharge the drum 109 to a potential level free from attachment of toner to the drum surface. The electrostatic latent image formed on the drum 109 is developed in a developing section by a developing apparatus 8 which will be described later. In order to prevent excessive image density and ensure satisfactory image density, to a developer-conveying sleeve 1*a* to be described later is applied a developing bias voltage from a voltage source 108.

A toner image obtained as a result of development is transferred by a transfer charger 115 onto a transfer or copy sheet 110 fed by feed rollers 121 and 122 along a guide 120. The copy sheet 110 is discharged by a separation discharger 116 to be separated from the drum 109 and fed by a belt 118 to a fixing unit 119. After the fixing, the copy sheet is brought out of the image-forming apparatus. Residual toner remaining on the drum surface after the transfer is removed by a cleaning unit 117.

Figure 4A:
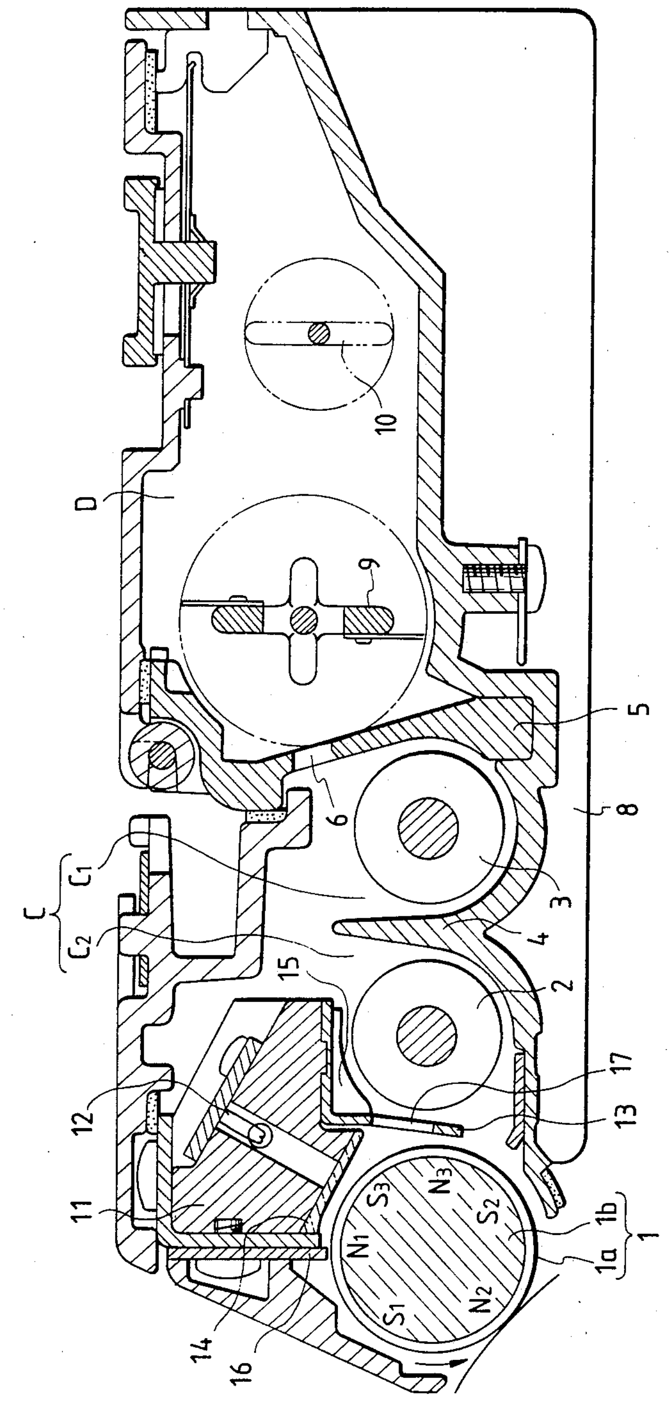
FIG. 4A is a sectional view for explaining an example of a developing apparatus which can be used according to the invention.
Figure 4B:
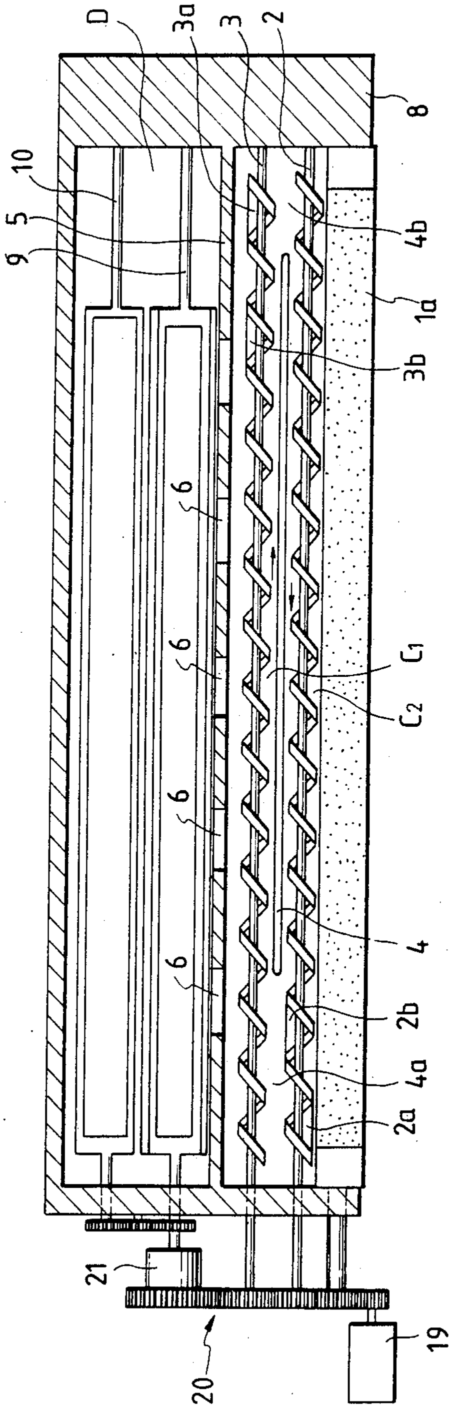
FIG. 4B is a horizontal sectional view showing the developing apparatus shown in FIG. 4A.

FIGS. 4A and 4B show an example of the developing apparatus, to which the invention can be applied.

Referring to these Figures, the developing apparatus 8 has its interior divided by a partitioning wall 5 into a toner chamber D and a developer chamber C for accommodating a two-component developer consisting of toner particles and magnetic particles as carrier. Toner in the toner chamber D and developer in the developer chamber C are not shown. The developer chamber C is divided by a partitioning wall 4 into a developer agitation section C1 and a developer supply section C2 for supplying developer to a developer-conveying member 1. The toner chamber D also accommodates toner feed members 9 and 10 as toner-feeding means. As these toner feed members 9 and 10 are rotated, toner in the toner chamber D is supplied for replenishment through toner replenishment holes 6 formed in the partitioning wall 5 to the developer chamber C.

Replenishment toner supplied from a toner replenishment hole 6 corresponding to the downstream end of a developer-agitating screw 3 (see FIG. 3B) turns to be conveyed by the developer-conveying member 1 in several minutes. Therefore, when the toner reaches the developer-conveying member 1, it has to be sufficiently agitated and mixed in the developer.

Accordingly, in this embodiment a fin-like member 3*b* is provided on the screw 3 at a position thereof between the toner replenishment hole 6 corresponding to the downstream end of the screw and an opening 4*b* for delivery of developer from the developer-agitating section C2 to the developer-conveying member 1 and developer supply section C2.

With this arrangement, stagnation of developer is produced due to a temporary vortex thereof produced at the position of the fin-like member 3*b*. Under the condition of this vortex, the supplied replenishment toner is sufficiently agitated and mixed with developer before being transported to the delivery section 4*b*.

In FIG. 4A, the developer-conveying member 1 includes a developing sleeve 1*a* of a non-magnetic material disposed in the developer chamber C and accommodating a magnet roll 1*b*. Designated at N1 to N3 and S1 to S3 are pole positions of the magnet roll 1*b*. The magnet roll 1*b* is secured at the opposite ends and is not rotatable, and the developing sleeve 1*a* surrounding the magnet roll 1*b* is rotated in the direction of the arrow and at a predetermined peripheral speed.

Rotatable screws 2 and 3 are provided as developer agitation and transportation means and extend substantially parallel to the developing sleeve 1*a*. These screws 2 and 3 are rotated such that they transport developer in opposite directions. In this embodiment, developer is transported in the direction of the arrows in FIG. 4B. The partitioning wall 4 provided in the developer chamber C defines openings 4*a* and 4*b* adjacent to its opposite ends as shown in FIG. 4B. Delivery of developer transported by the screws 2 and 3 between the sections C1 and C2 is effected through the openings 4*a* and 4*b*. The screws 2 and 3 are provided with fin-like members 2*a*, 2*b* and 3*b* at the illustrated positions to permit quick delivery of the developer.

In the developer chamber C of the developing apparatus 8, developer circulation regulators 11 and 15 are provided for designating an area of the periphery of the developing sleeve 1*a*, along which developer is circulated.

Developer on the periphery of the sleeve 1*a* is transported toward a developing section while it is partly scraped off by a developer scraper 13. The developer scraped off by the scraper 13 is mixed with a developer being transported by the developer-transporting screen 2. The screen 2 transports part of the transported developer toward a developer-bearing member. The developer transported toward the developing section with the rotation of the developing sleeve 1 is forced into a gap defined between the developer circulation regulator 11 and developing sleeve 1*a* to be transported as a dense stream and quickly. Developer is further transported to the outside of the developing apparatus 8 its brush height regulated by a doctor blade 16.

A toner concentration sensor 12 has a window 14, which is located at a predetermined position in a plane substantially identical with the surface of the developer circulation regulator 11 facing the developing sleeve 1a. With this arrangement, it is possible to meet the requirements for quick transportation of developer to the sensor surface 14, adequate agitated and mixed conditions of developer on the sensor surface 14 and necessary quantity and uniform density of developer on the sensor surface 14 for sensing the toner concentration.

Particularly, since the sensor surface 14 of the sensor 12 is substantially identical to the surface of the developer circulation regulator 11 facing the sleeve 1a, an equal flow of developer can be obtained in the sensor area and other area. That is it is possible to eliminate problems that may otherwise be posed when the sensor 12 is disposed near the developing sleeve 1a.

Figure 5:
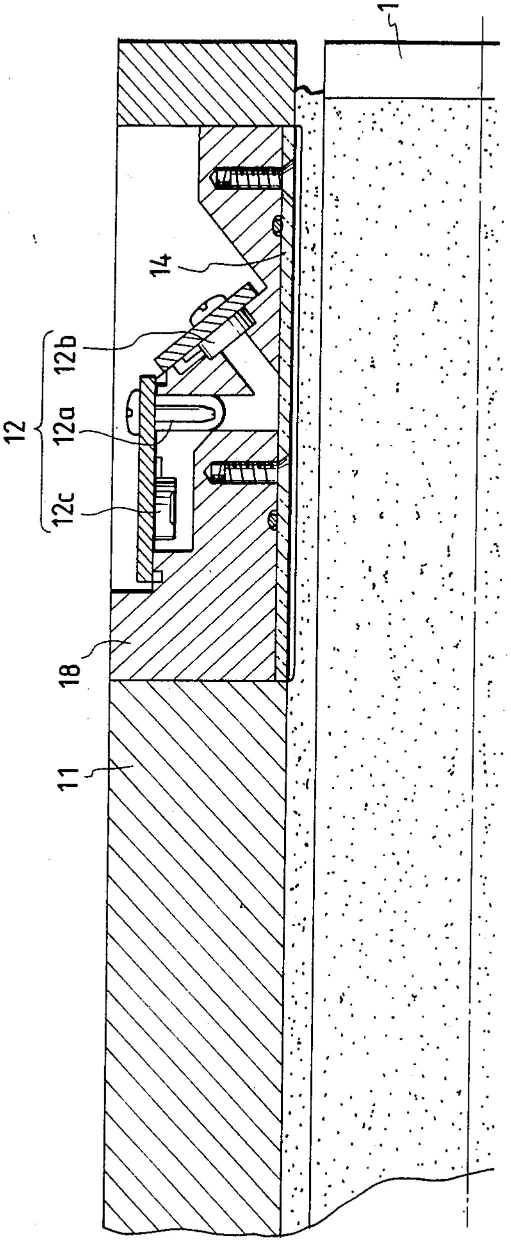
FIG. 5 a sectional view showing a toner concentration sensor.

FIG. 5 is an enlarged-scale sectional view of the toner concentration sensor 12. The sensor 12 includes a lamp 12a as light emitter for measuring the toner concentration to be described later, a photoelectric converter 12b for detecting the intensity of light reflected by developer illuminated by the lamp 12a (the intensity corresponding to the toner concentration) and a photoelectric converter 12c for detecting the intensity of light emitted from the lamp 12a. The sensor 12 also includes a housing 18 made of a light-blocking material. The detection window 14 is made of a transparent material and is located at a predetermined position in a plane substantially identical with the surface of the developer circulation regulator 11 facing the developing sleeve 1a. The photoelectric converters 12b and 12c provide voltage signals corresponding to the intensity levels of light incident on them.

The output signal of the photoelectric converter 12c is used as reference signal.

As shown in FIG. 4B, the sleeve 1a, screws 2 and 3 and toner feed members 9 and 10 are rotated using a motor 19 via a gear train 20. A clutch 21 is provided in the gear train. When the clutch 21 is energized, the torque of the motor 19 is transmitted to the toner feed members 9 and 10. The clutch 21 is energized when toner is supplied from the chamber D to the chamber C. At this time, the screws 2 and 3 and sleeve 1a are rotated along with the toner feed members 9 and 10. When no toner is supplied from the chamber D to the chamber C, the clutch 21 is held de-energized, i.e., inoperative. At this time, therefore, the screws 2 and 3 and sleeve 1a are rotatable while the toner feed members 9 and 10 are held stationary.

Figure 6:
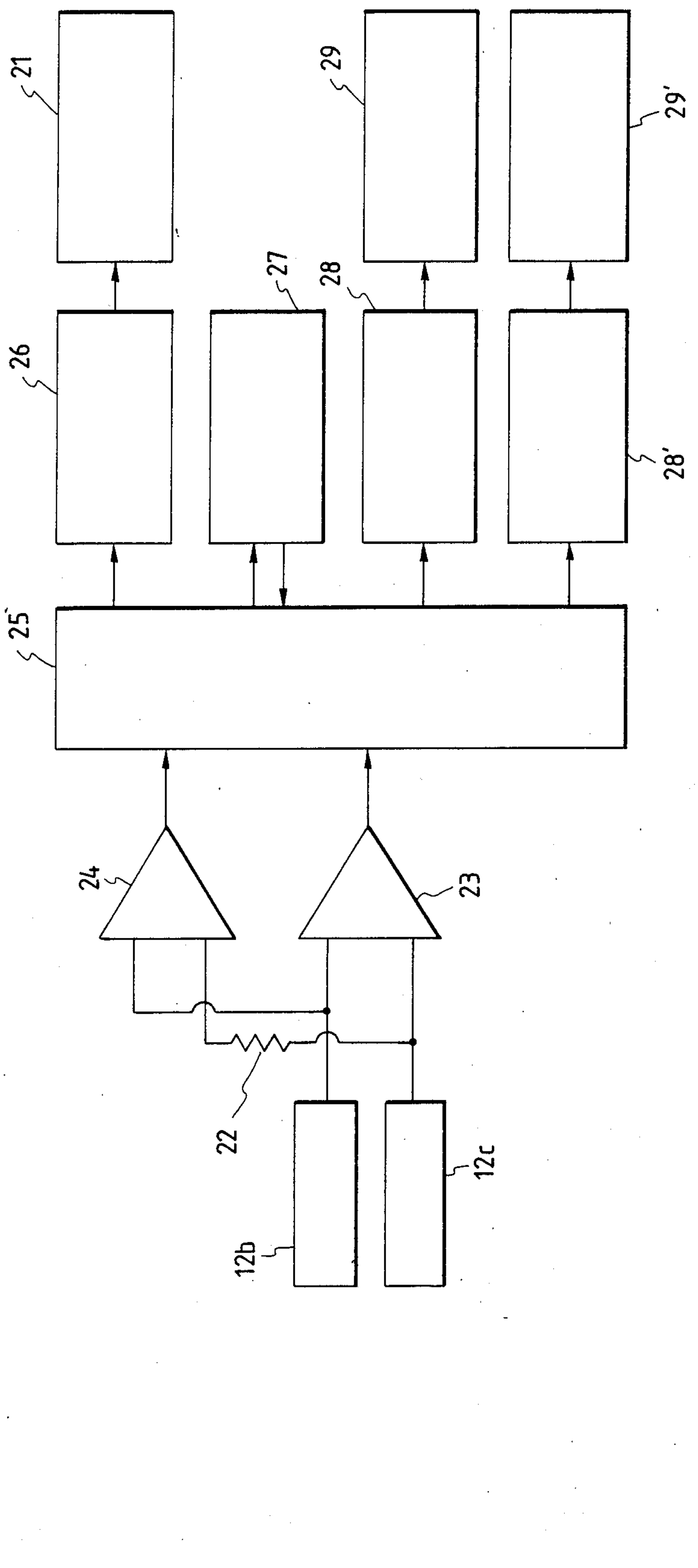
FIG. 6 is a block diagram showing a control circuit.

As shown in FIG. 6, a signal from the photo-electric converter 12b, i.e., toner concentration signal Vb corresponding to the toner concentration Tb of developer is supplied to comparators 23 and 24. The signal voltage Vb of the toner density is high when the toner concentration is high. A signal of the photoelectric converter 12c, i.e., voltage signal Vc is supplied as a first reference signal to the comparator 23, while a signal of voltage Vc1 is supplied as a second reference signal to the comparator 24. The voltage Vc1 is lower than the voltage Vc, and hence a toner concentration To1 represented by the voltage Vc1 is lower than the desired toner concentration To, i.e., toner concentration represented by the voltage Vc. The second reference signal Vc1 can be readily obtained by coupling the signal from the photoelectric converter 12c through a resistor or like load 22. The desired toner concentration is one, to which the toner concentration is controlled. At the commencement of use of the developing apparatus, the desired toner concentration is usually the toner concentration of developer freshly charged into the developing apparatus, i.e., initial toner concentration. When it is detected that the toner concentration of developer is above the initial toner concentration, the supply of replenishment toner to the developer chamber C is stopped, while it is effected when it is detected that the toner concentration is lower than the desired toner concentration.

The comparator 23 provides a signal of level "1" when the toner concentration signal voltage Vb is above the first reference signal Vc while providing a signal of level "0" when the voltage Vb is lower than the first reference signal voltage. The comparator 24, on the other hand, provides a signal of level "1" when the voltage Vb is higher than the second reference signal voltage Vc1 while providing a signal of level "0" when the voltage Vb is lower than the second reference voltage Vc1. A central processing unit (CPU) 25 containing a microcomputer judges the toner concentration of developer according to the signals from the comparators 23 and 24 and controls the supply of replenishment toner from the toner chamber D to the developer chamber C in a routine shown in the flow chart of FIG. 7.

More particularly, when $Vb<Vc$, i.e., when the detected toner concentration Tb is in a first range above Tc, the CPU 25 de-energizes the clutch driver 26 to de-energize the clutch 21 so as to discontinue rotation of the toner feed members 9 and 10. As a result, the supply of replenishment toner from the chamber D to the chamber C is discontinued.

Figure 9A:
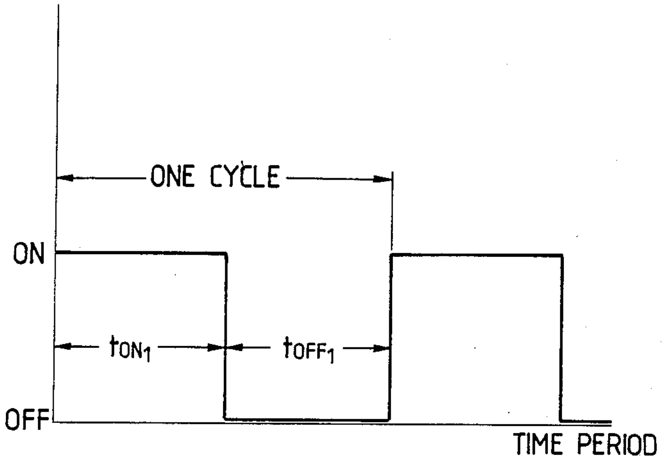
FIGS. 9A and 9B are graphs for explaining toner replenishment operation.

When $Vc1 \leqq Vb < Vc$, i.e., when the detected toner concentration Tb is in a second range between Tc1 and Tc, the CPU 25 does not cause suspension of the copying operation (i.e., image-forming operation) of the image-forming apparatus, but it operates the clutch driver 26 as shown in FIG. 9A. That is, it energizes the clutch 21 periodically for a predetermined period of time in each cycle, thus causing intermittent rotation of the toner feed members 9 and 10 to supply replenishment toner intermittently from the chamber D to the chamber C. The clutch 21, as shown in FIG. 9A, is held energized for time $t_{ON1}$ and de-energized for time $t_{OFF1}$. This cycle of energization and de-energization is repeated until the detected toner concentration Tb is above Tc.

When $Vb<Vc1$, the rate of toner consumption is high due to high image ratio of original or like cause. Under this condition of $Vb<Vc$, i.e., when the detected toner concentration Tb is in a third range above Tc1, for causing quick restoration of the toner concentration to the first toner concentration range the CPU 25 provides a command signal for suspending the copying operation for a while to the control circuit 27, which includes a microcomputer for controlling the operation of various image formation means as described before in connection with the image-forming apparatus shown in FIG. 3, while also it energizes the clutch driver 26 in a manner as shown in FIG. 9A for supplying toner from the chamber D to the chamber C. The control circuit 27 thus suspends the operation of the optical system to suspend exposure of the drum 109 to light image. With an image-forming apparatus, in which the drum 109 is rotated and the precharger 111 is operative in a copying suspension mode, under the above condition the control circuit 27 turns on the discharging lamp 107 to bring the drum surface to a potential, at which no toner is attached to the drum surface. It is possible to stop the drum 109 and also render the precharger 111 inoperative in the copying suspension mode. Further, in the copying suspension mode the development bias voltage source 108 may be held either operative or inoperative. However, the drive motor 19 is held energized to provide uniform toner concentration of the entire developer by agitating supplied replenishment toner and developer.

In either case, in the copying suspension mode no light image is provided, thus suppressing toner consumption on the drum 109. The toner concentration thus is quickly restored to the first toner concentration range. When it is detected that the toner concentration Tb is above Tc, the CPU 25 discontinues toner replenishment and provides a command signal to resume copying. Thus, the copying operation (i.e., image-forming operation) is resumed.

Figure 10:
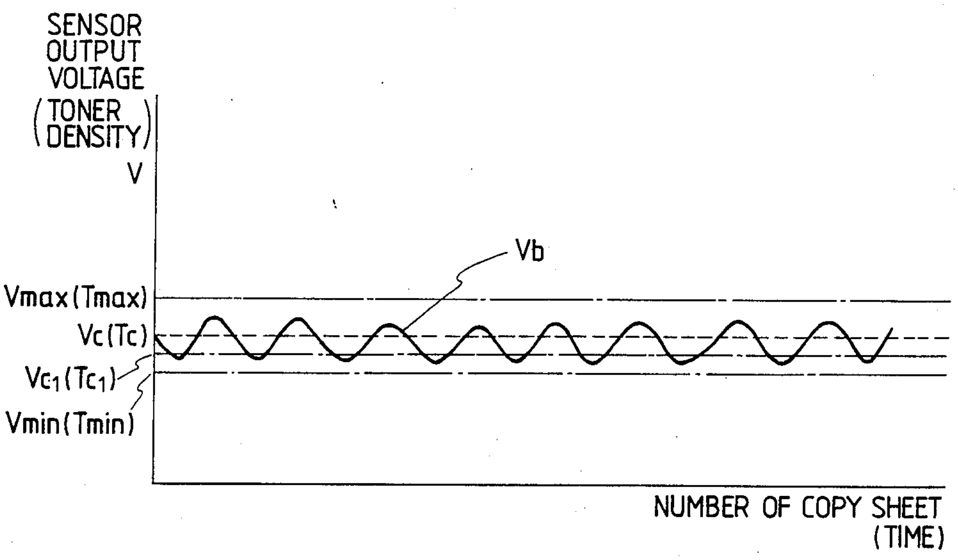
FIG. 10 is a graph for explaining toner concentration changes in an embodiment of the invention.

It is thus possible to maintain the toner concentration in a range between Tmin and Tmax as shown in FIG. 10 even when copying of high image ratio original is continued.

The second reference signal voltage Vc1 is simultaneously set such that it is lower than Vc and higher than Vmin, i.e., it is lower than the sensor output voltage corresponding to the desired toner concentration Tc and higher than the sensor output voltage Vmin corresponding to the minimum toner concentration Tmin, i.e., lower limit of a permissible image density range. Further suitably, the voltage Vc1 corresponds to a toner concentration such that the amount of toner attached to the drum 109 and thus consumed is greater than the amount of replenishment toner supplied, but this is not essential.

Figure 7:
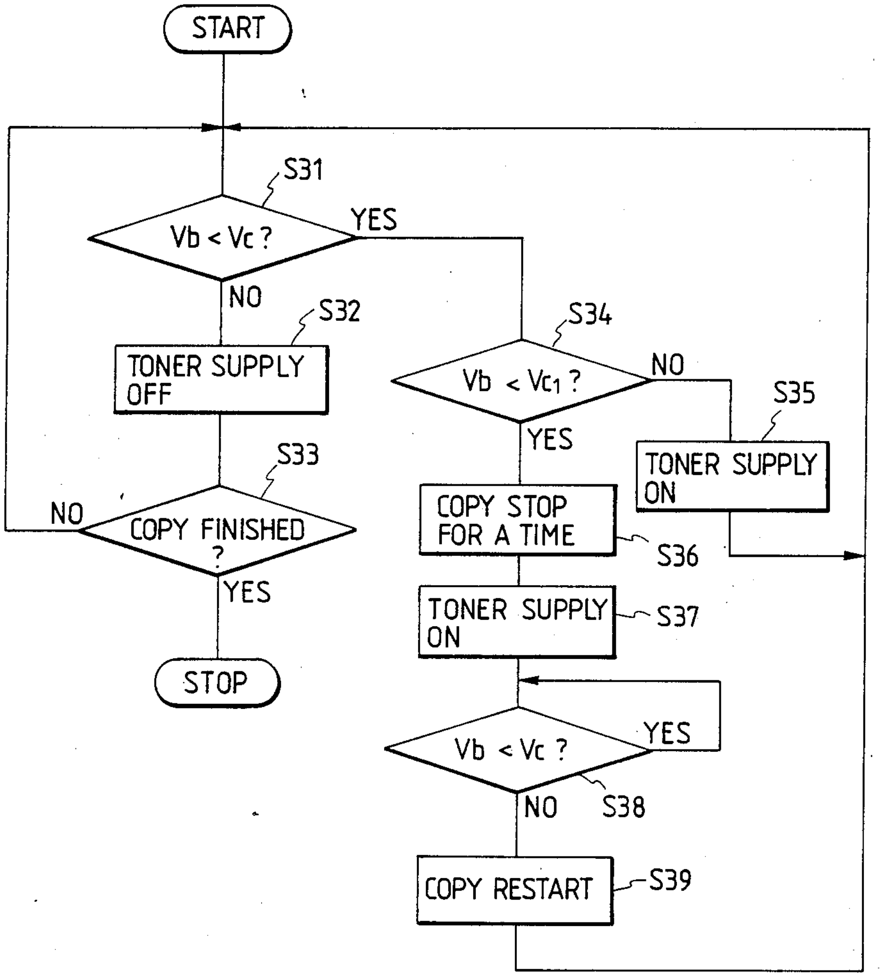
FIG. 7 is a flow chart for explaining an example of control.

In FIG. 7, in steps S31 and S38 a check is done as to whether Vb is lower than Vc, in step S32 a toner replenishment "off" command is delivered, in a step S33 a check is done as to whether copying is finished, i.e., whether a predetermined number of copy sheets are obtained, in a step S34 a check is done as to whether Vb is lower than Vc1, in steps S35 and S37 a toner replenishment "on" command is delivered, in a step S36 a copying suspension command is delivered, and in a step S39 a copying resumption command is delivered.

In the above embodiment, the first and second reference values are provided. However, this is by no means limitative. For instance, it is possible to provide a third reference value Vc2 such that $$Vmin < Vc2 < Vc1 < V3.$$

In this case, when Vc2<Vb<Vc1, the number of times of toner replenishment may be increased compared to the case of Vc2<Vb<Vc1 to increase the amount of replenishment toner supplied per unit time without suspending the copying operation, while when Vmin<Vb<Vc2, the number of toner replenishment cycles may be increased while suspending the copying operation. The number of times of toner replenishment may be increased by reducing the cycle time shown in FIGS. 9A and 9B.

Figure 9B:
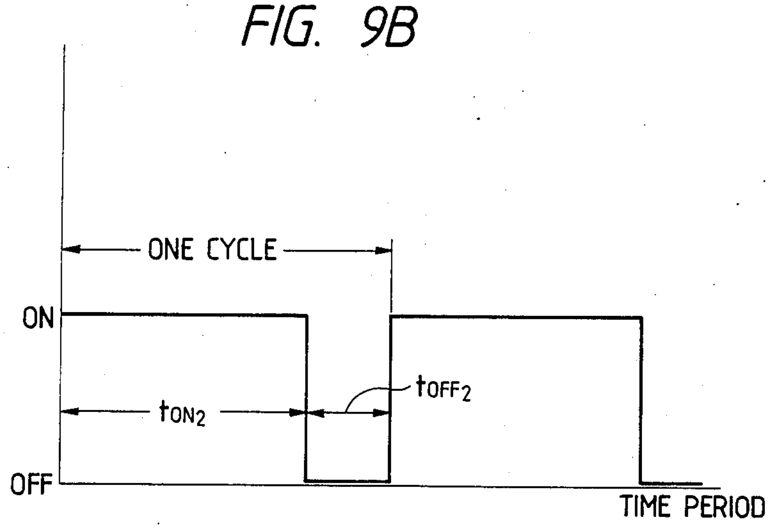

In the first embodiment, one toner replenishment cycle consists of a combination of $t_{ON1}$ and $t_{OFF1}$ with $t_{ON1}=t_{OFF1}$ as shown in FIG. 9A. However, this operation is by no means limitative. For example, one toner replenishment cycle may consist of $t_{ON1}$ and $t_{OFF1}$ with $t_{ON1}=t_{OFF1}$ as shown in FIG. 9B. As a further alternative, it may consist of $t_{ON2}$ and $t_{OFF2}$ with $t_{ON}<t_{OFF}$. As a still further alternative, it may consist of a plurality of $t_{ON}$ and $t_{OFF}$ periods.

Figure 8:
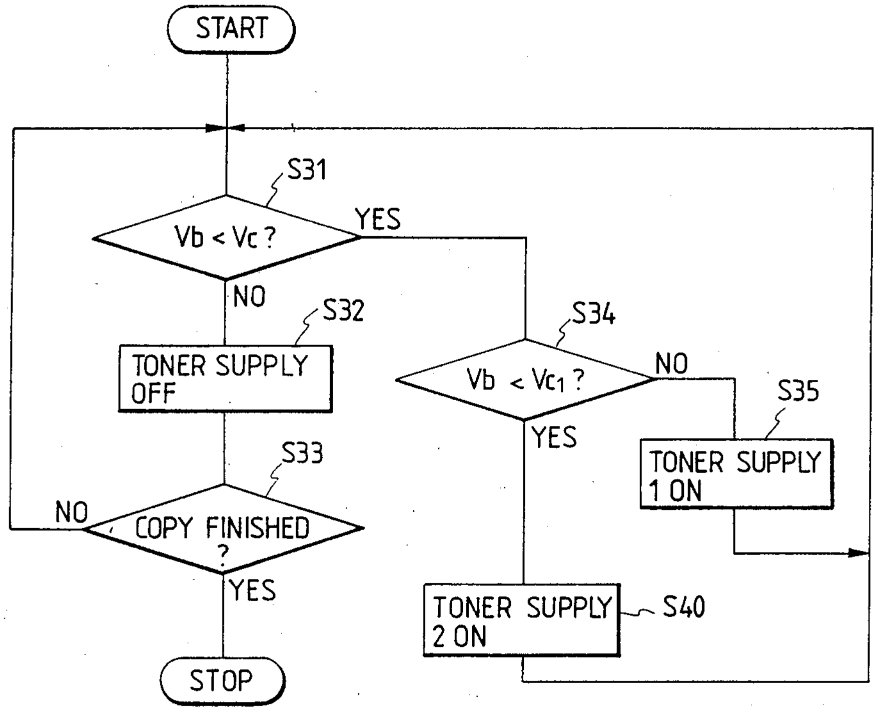
FIG. 8 is a flow chart for explaining a different example of control.

In the first embodiment, the toner replenishment routine as shown in FIG. 7 is executed when Vb<Vc1. However, this is by no means limitative. For example, it is possible to execute a toner replenishment routine as shown in FIG. 8. In FIG. 8, TONER SUPPLY 1 and TONER SUPPLY 2 correspond to the cycles of FIGS. 9A and 9B, respectively.

In FIG. 8, in a step S35 toner is supplied from the chamber D to the chamber C in a manner as shown in FIG. 9A, while in a step S40 it is supplied in a manner as shown in FIG. 9B. In this step S40, the clutch "on" period $t_{ON2}$ in one cycle is longer than the clutch "off" period $t_{OFF2}$. This means that toner is supplied from the chamber D to the chamber C in a greater amount per unit time than in the case of FIG. 9A. In FIG. 8, steps like those in FIG. 7 are designated by like reference symbols.

In the mean time, there is a well-known method of judgment of a "no toner signal" provided when toner in the toner chamber is reduced so that the amount of replenishment toner supplied can no longer overtake consumption by executing a check as to whether a condition of Vb<Vc is maintained for a predetermined period $t_{w1}$ of time.

Figure 11:
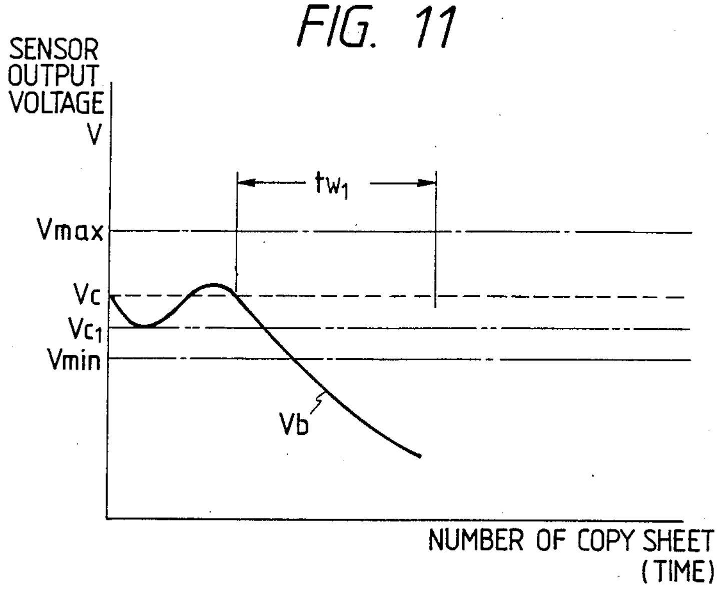
FIGS. 11 and 12 are graphs for explaining toner concentration changes when the developing apparatus is abnormal.

In the case of this method, however, there is a problem when extraordinary toner consumption is continued as shown in FIG. 11 due to occurrence of an abnormal condition such as developing bias leak. When this occurs, the operation of the developing apparatus is continued until the judgment noted above is made after lapse of the predetermined time period $t_{w1}$. In this case, therefore, there occur phenomena accompanying extraordinary reduction of toner concentration such as attachment of carrier to the latent image bearing medium until the end of operation. This has adverse effects not only on the developing apparatus but also on the image-forming apparatus body, in which the developing apparatus is provided.

Figure 12:
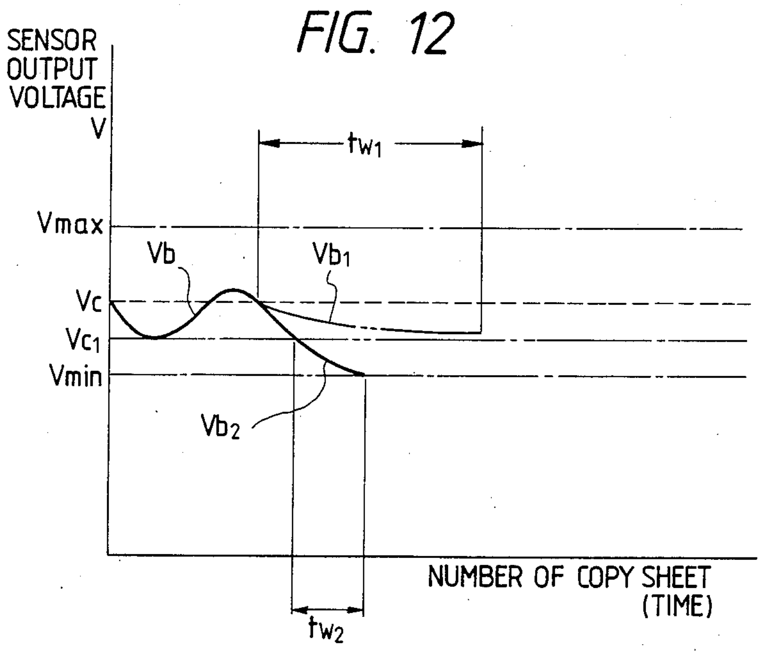
Figure 13:
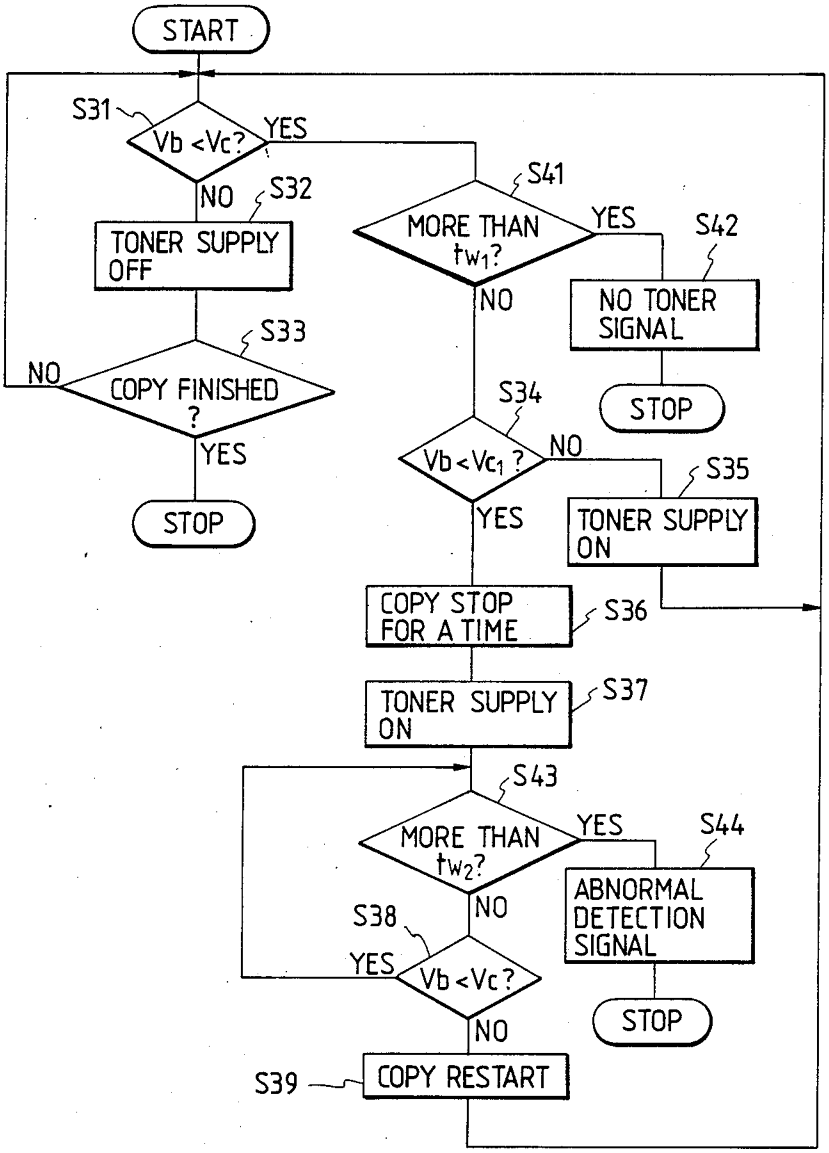
FIG. 13 is a flow chart for explaining a further example of control.

A following embodiment is intended to solve this problem. More specifically, the CPU 25 is adapted such that when it detects the sensor output signal Vb between Vc and Vc1 for a predetermined time period $t_{w1}$ as shown at Vb1 in FIG. 12 it provides a signal indicative of no toner (i.e., actually toner amount reduced to be less than a prescribed amount) in the toner chamber C and that when it detects that the sensor output voltage Vb was lower than Vc1 for a predetermined period $t_{w2}$ ($t_{w2}<t_{w1}$) as shown at Vb2 in FIG. 12 it provides a signal indicative of that the developing apparatus is abnormal. The flow chart of FIG. 13 shows the routine of this control. In FIG. 13, steps like those in FIG. 17 are designated by like reference symbols.

Referring to FIG. 13, in a step S41 the CPU 25 performs a check as to whether a condition with the detected toner concentration signal voltage Vb lower than the first reference voltage Vc is continued for more than time $t_{w2}$. If this is true, the CPU operates in a step S42 a first announcement means driver 28 to energize first announcement means 29 such as a buzzer or a light-emitting diode. The first announcement means 29 announces no toner or insufficient toner in the toner chamber D. When this announcement is made, the operator may replenish the toner chamber D with toner.

Meanwhile, in a step S43 the CPU 25 executes a check as to whether a condition with the detected toner concentration signal voltage Vb lower than the second reference voltage Vc1 for more than a time $t_{w2}$. If this is true, the CPU operates in a step S44 a second announcement means driver 28' to energize second announcement means 29' such as a light-emitting diode. The second announcement means 29' announces that the developing apparatus is abnormal.

Further, in the steps S42 and S44, the CPU 25 not only energizes the announcement means but also gives the control circuit 27 a command signal to stop entirely the operations of the image-forming means described before in connection with FIG. 3. Thus, the motor 19 shown in FIG. 5 is also stopped.

While the time period $t_{w2}$ is shorter than time $t_{w1}$, the time $t_{w1}$ may be set to be in a range of several ten to several hundred seconds, and the time $t_{w2}$ may be set to be in a range a ten and several to several ten seconds.

In the above embodiment, the first and second reference values are provided. However, this is by no means limitative, and it is possible to set any desired number of reference values such as $$Vc > Vc1 > Vc2 \quad (1)$$

$$t_{w1} > t_{w2} > t_{w3} \quad (2)$$

Figure 14:
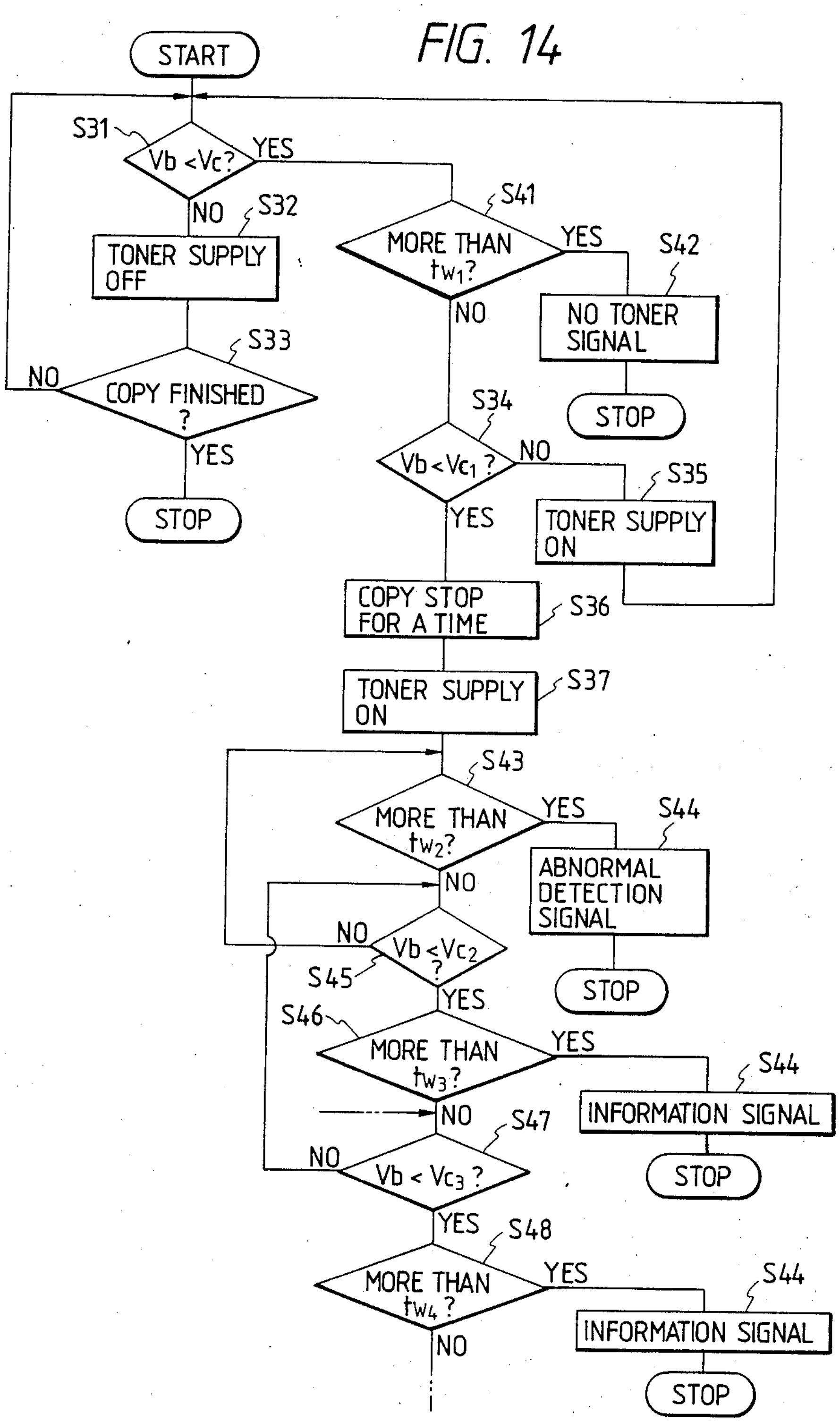
FIG. 14 is a flow chart for explaining a still further example of control.

In this case, an abnormality detection signal and other information signal may be provided when a range defined between adjacent reference values is continued for a predetermined period of time, as shown in the flow chart of FIG. 14. In FIG. 14, steps S45 and S47 are like the step S34, and steps S46 and S48 are like the step S45.

Figure 15:
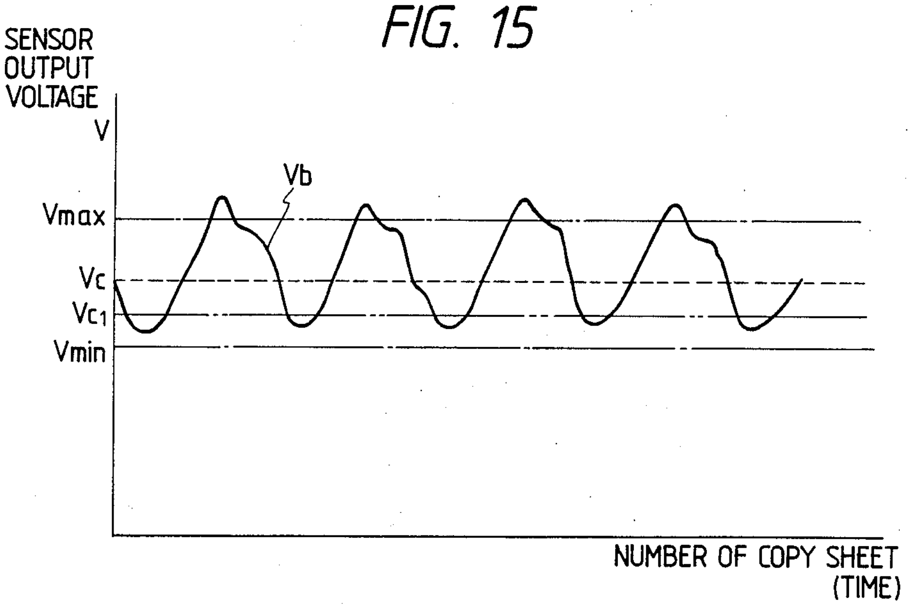
FIG. 15 is a graph for explaining toner concentration changes when the toner concentration temporarily becomes excessive.

In the mean time, when toner concentration detection response to toner replenishment is slow, over-supply of toner as shown in FIG. 15 may take place while an original with an excessively low image density is being copied. Further, when the amount of toner supplied per unit time is increased, this toner replenishment is continued until developer resulting from agitation and mixing of supplied toner with previous developer is transported to the sensor section. Therefore, over-supply of toner as shown in FIG. 15 will take place again at the instant of detection of the resultant developer. To overcome such deficiency, according to the invention toner replenishment is performed depending on the toner concentration condition. To this end, the following toner concentration conditions I to III are set.

Condition I: Vc≦Vb (i.e., when the toner concentration is in the first toner concentration range)

Condition II: Vc1≦Vb<Vc (i.e., when the toner concentration is in the second toner concentration range)

Condition III: Vb<Vc1 (i.e., when the toner concentration is in the third toner concentration range)

Under the condition II, the toner replenishment is performed in a manner as shown in FIG. 9A. Under the condition III, it is performed in a manner of FIG. 9B, i.e., with a greater amount of toner supplied per unit time than in the case of FIG. 9A. The CPU 25 controls the toner replenishment as follows.

(a) Under the condition I, the toner replenishment is suspended, while permitting copying.

(b) When the condition I is changed over to the condition II or when the condition II is not continued beyond time t1, toner replenishment is performed while continuing copying.

(c) When the condition II is continued beyond time t1, toner replenishment is performed by temporarily suspending copying.

(d) Under the condition III toner replenishment is performed by temporarily suspending copying.

(e) When the condition III is changed over to the condition I, the toner replenishment is suspended, and also the copying operation is suspended for a time period t3 from the instant of start of toner replenishment suspension. However, for the time t3 the motor 19 is operated with the clutch 21 held de-energized. That is, during this period the developer in the developer chamber C is agitated with rotation of the screws 2 and 3 and sleeve 1*a*.

(f) Unless restoration of the condition I from the condition II or III does not occur in a predetermined time period t2, a no toner signal is provided to energize the display means, while suspending copying.

Figure 16A:
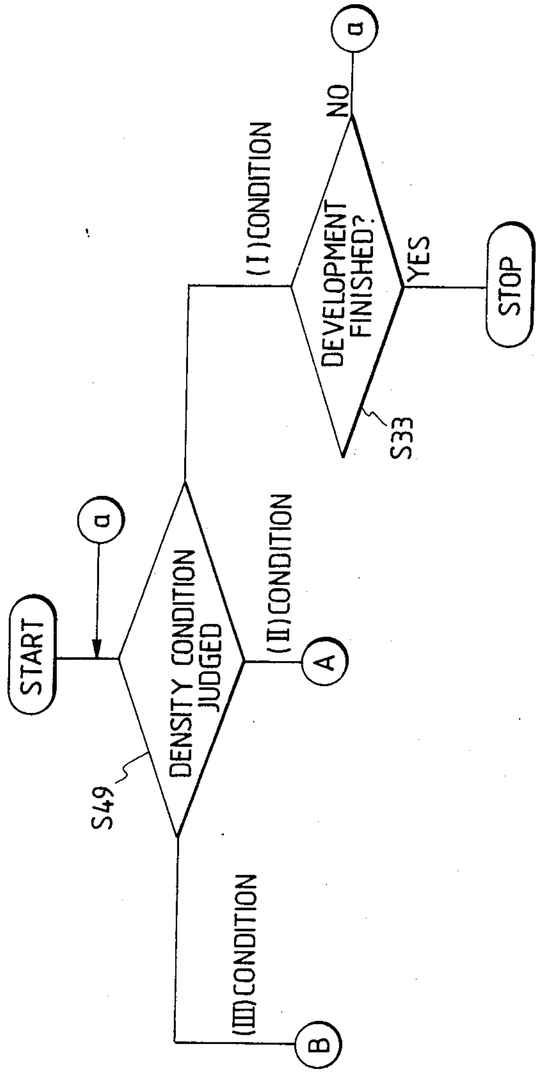
Figs. 16A, 16B and 16C are flow charts for explaining yet further examples of control.
Figure 16B:
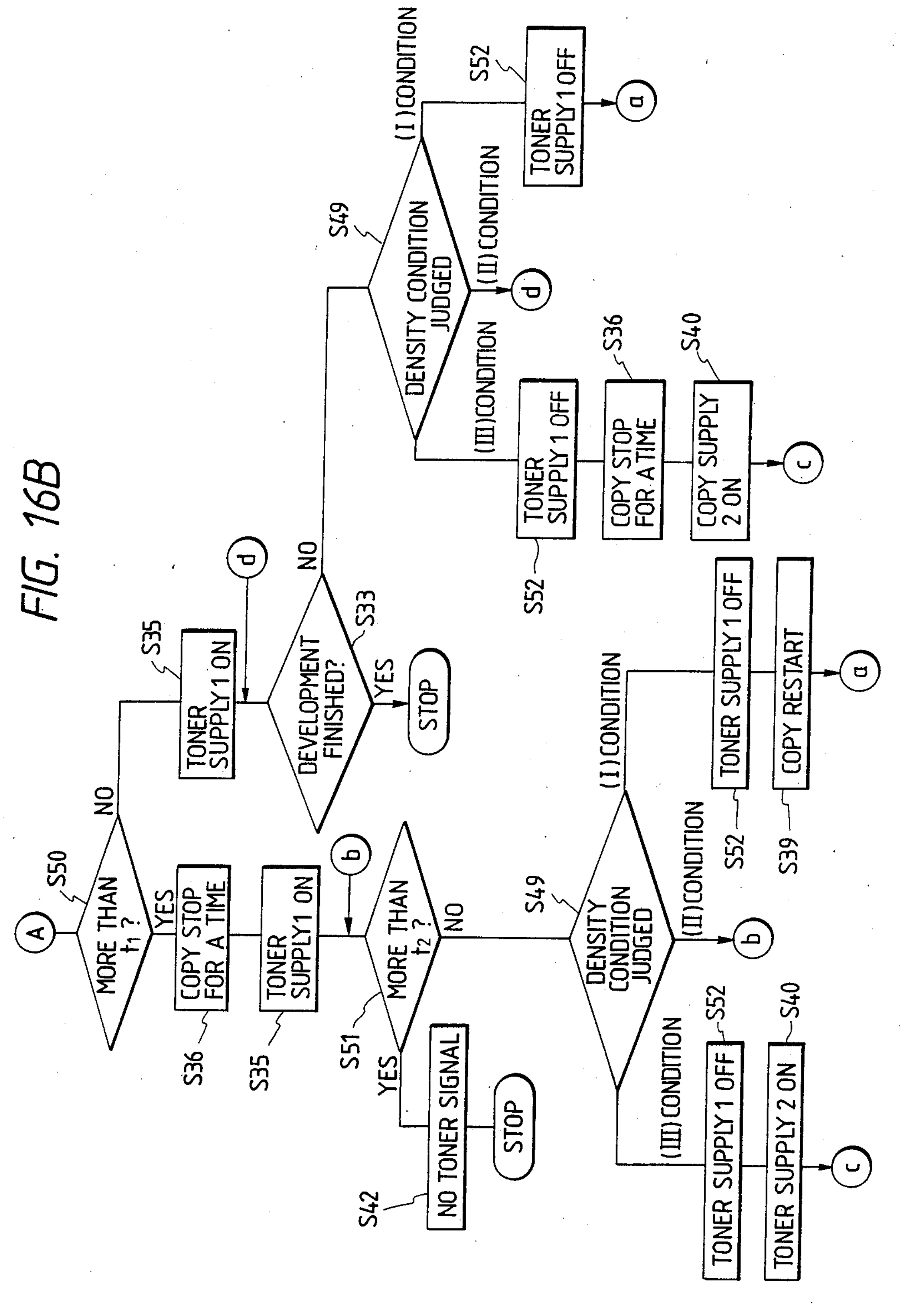
Figure 16C:
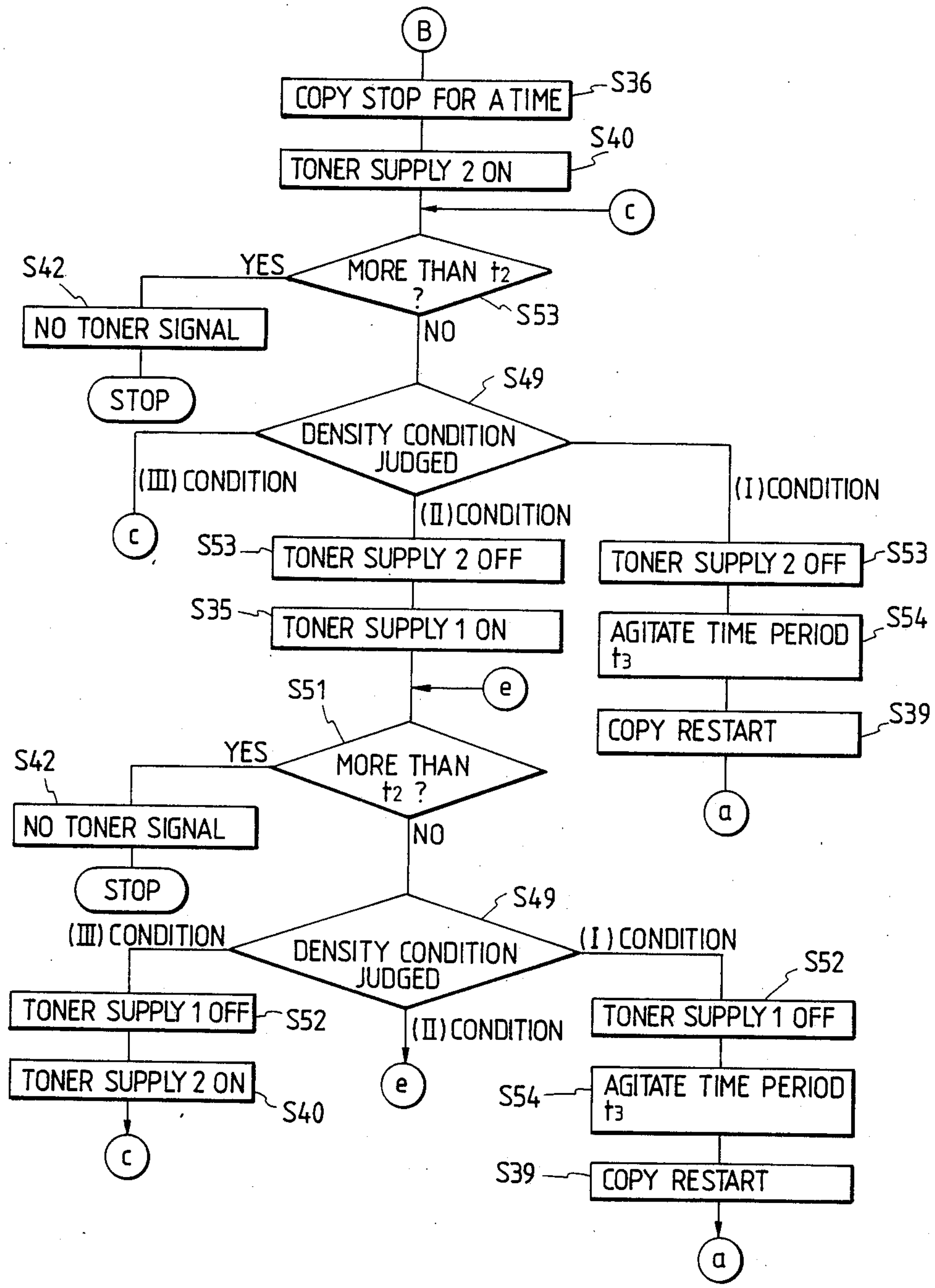

The flow charts of FIGS. 16A to 16C illustrate the above control. In these Figures, steps that have been already described are designated by reference symbols like those in FIGS. 7, 8, 13 and 14, and only the other steps than these will be described. In step S49 the CPU 25 executes a check as to whether there is toner concentration condition I, II or III. In a step S50 it checks whether the condition II is continued for more than time t1. In a step S51 it checks whether the condition is continued for more than time t2. In a step S52 it suspends the toner replenishment in the manner shown in FIG. 9A. In a step S53 it checks whether the condition III is continued for more than time t2. In a step S53 it suspends the toner replenishment in the manner of FIG. 9B. In a step S54 it drives the screws 2 and 3 and sleeve 1*a* for agitating the developer in the chamber C for time t3.

In the above control, the condition II is changed over to the condition I in two ways, i.e., (i) through the condition III, and (ii) not through the condition III.

The toner replenishment routine is varied in these two cases when the toner concentration condition I is restored, that is, in the case (i) an agitating operation with suspension of copying for t3 is performed, while in the case (ii) the copying operation is resumed as soon as the condition I is restored.

Further, depending on the duration of the condition II, the toner replenishment control is effected in two different ways, i.e., causing toner replenishment without suspension of copying and suspending copying.

Thus, excessive toner concentration increase can be prevented by toner replenishment control effected according to the way of change of the toner concentration condition, for instance by causing toner replenishment for the case with toner consumption less than standard as the case (b) noted above, causing toner replenishment for the case with toner consumption slightly greater than standard as the case (c), quickly restoring toner concentration for the case with extremely great toner consumption as the case (d) and adopting the manner of FIG. 9B and causing an agitating operation as the case (e) even when the toner concentration is restored.

The way of change of the amount of toner supplied per unit time as described above is by no means limitative; for instance it is possible to change the rotational speed of the toner feed members 9 and 10.

While in the above description the toner concentration is detected optically, this is by no means limitative;

for instance it is possible to adopt a volume detection system, an inductance detection system, etc.

Further, the invention is applicable as well to an image-forming apparatus, in which an electrostatic latent image is formed on a photosensitive medium by exposure of the medium using a laser beam or light-emitting diode light beam modulated according to an image-forming signal. For such an image-forming apparatus, a developing apparatus of inversion development type may be used, in which toner is caused to be attached to bright potential areas of a photosensitive medium.

We claim:

1. An image forming apparatus comprising:

an image-bearing member;

latent image forming means for forming an electrostatic latent image on said image-bearing member;

developing means for developing said electrostatic latent image, said developing means including a developer chamber for accommodating a developer including toner and carrier, a toner chamber for accommodating said toner, toner supply means for supplying toner in said toner chamber to said developer chamber, a developer-conveying member for conveying developer supplied form said developer chamber to a developing section by bearing said developer on a surface of said developer-conveying member and a sensor for detecting the toner concentration in the developer; and control means for controlling the supply of toner from said toner chamber to said developer chamber by using a detected toner concentration signal from said sensor, said control means supplying toner in a first mode when said detected toner concentration signal represents a toner concentration between a first toner concentration and a second toner concentration lower than said first toner concentration and supplying toner in a second mode different from said first mode when said detected toner concentration signal represents a toner concentration lower than said second toner concentration.

2. An image-forming apparatus according to claim 1, wherein said control means compares said detected toner concentration signal to a first reference signal corresponding to said first toner concentration and also to a second reference corresponding to said second toner concentration signal.

3. An image-forming apparatus according to claim 1 or 2, wherein in said second mode, said control means operates said toner supply means while suspending an image-forming operation of said image-forming apparatus.

4. An image-forming apparatus according to claim 1 or 2, wherein said control means operates said toner supply means such that the amount of toner supplied per unit time is greater in said second mode than in said first mode.

5. An image forming apparatus comprising:

an image-bearing member;

latent image forming means for forming an electrostatic latent image on said image-bearing member;

developing means for developing said electrostatic latent image, said developing means including a developer chamber for accommodating a developer including toner and carrier, agitating means for agitating the developer in said developer accommodating chamber, a toner chamber accommodating said toner, toner supply means for supplying toner in said toner chamber to said developer chamber, a developer-conveying member for conveying developer supplied from said developer chamber to a developing section for said developer on a surface of said developer-conveying member and a sensor for detecting the toner concentration in the developer; and control means for controlling the supply of toner from said toner chamber to said developer chamber by using a detected toner concentration signal from said sensor, said control means supplying no toner when said detected toner concentration signal represents a first toner concentration range higher than a first toner concentration, supplying toner in a first mode when said detected toner concentration signal represents a second toner concentration range between said first toner concentration and a second toner concentration lower than said first toner concentration and supplying toner in a second mode different from said first mode when said detected toner concentration signal represents a third toner concentration lower than said second toner concentration.

6. An image-forming apparatus according to claim 5, wherein said control means compares said detected toner concentration signal to a first reference signal corresponding to said first toner concentration and also to a second reference signal corresponding to said second toner concentration.

7. An image-forming apparatus according to claim 5 or 6, wherein in said second mode said control means operates said toner supply means while suspending an image-forming operation of said image-forming apparatus.

8. An image-forming apparatus according to claim 7, wherein when the toner concentration in the developer is changed from a value in said third toner concentration range to a value in said first toner concentration range, said control means operates said agitating means for a predetermined period of time while suspending the operation of said toner supply means and the image-forming operation of said image-forming apparatus.

9. An image-forming apparatus according to claim 8, wherein said control means operates said toner supply means such that the amount of toner supplied per unit time is greater in said second mode than in said first mode.

10. An image-forming apparatus according to claim 5 or 6, wherein said control means operates alarm means if the toner concentration in the developer is not restored to said first toner concentration range after a predetermined period of time.

11. An image-forming apparatus according to claim 10, wherein in said second mode, said control means operates said toner supply means while suspending the image-forming operation of said image-forming apparatus.

12. An image-forming apparatus according to claim 10, wherein said control means operates said toner supply means such that the amount of toner supplied per unit time is greater in said second mode than in said first mode.

* * * * *

UNITED STATES PATENT AND TRADEMARK OFFICE

CERTIFICATE OF CORRECTION

PATENT NO. 4,985,823

DATED January 15, 1991

INVENTOR(S) TATSUYA TADA, ET AL.

It is certified that error appears in the above-indentified patent and that said Letters Patent is hereby corrected as shown below:

COLUMN 11

Line 25, "form" should read --from--.
Line 46, "second reference" should read --second reference signal--.
Line 47, "concentration signal." should read --concentration.--

Signed and Sealed this

Seventeenth Day of October, 1995

Attest:

Bruce Lehman

BRUCE LEHMAN

*Attesting Officer*

*Commissioner of Patents and Trademarks*